(No Model.) 2 Sheets—Sheet 1.
G. C. BARDONS, J. G. OLIVER & G. W. DRAKE.
DUPLEX FORMING MACHINE.
No. 553,802. Patented Jan. 28, 1896.
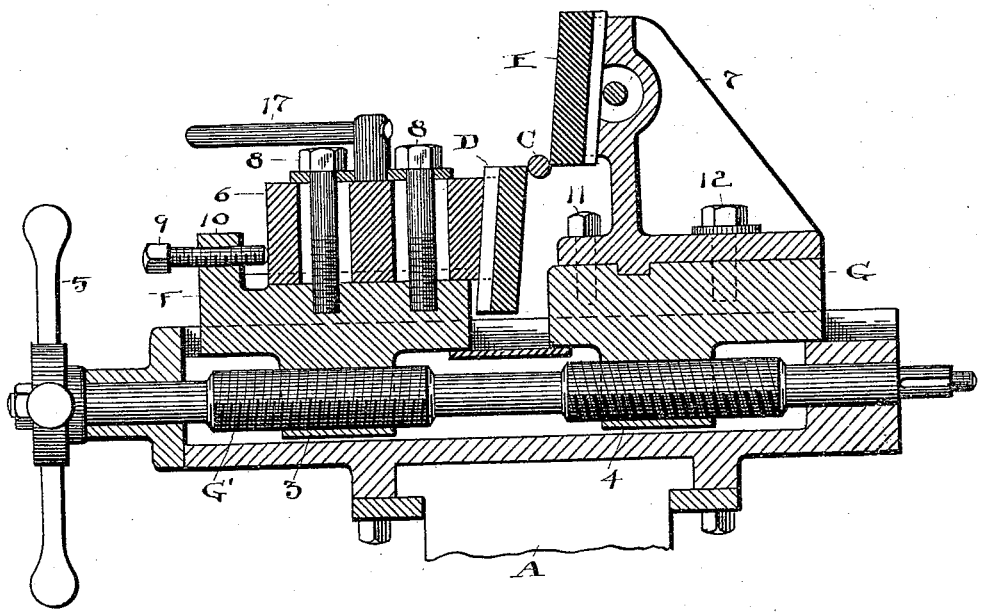
Fig. 1.
Fig. 2.
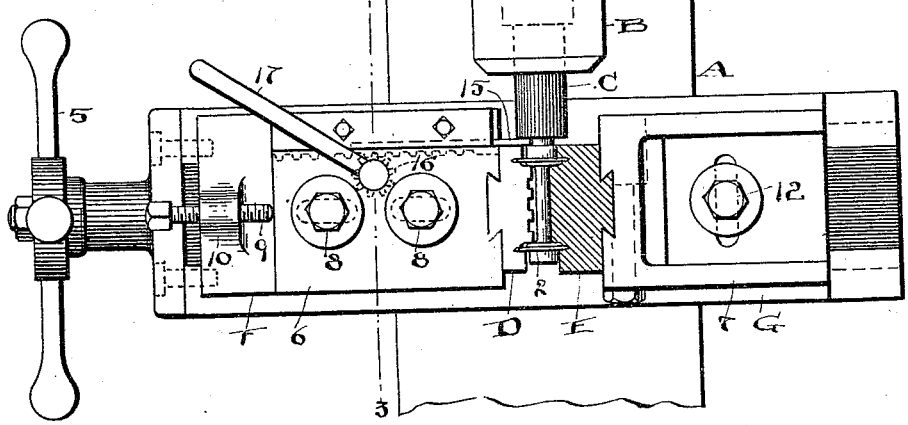
ATTEST
INVENTORS
George C. Bardons
John G. Oliver
George W. Drake
By H. J. Fisher ATTY (No Model.) 2 Sheets—Sheet 2.

G. C. BARDONS, J. G. OLIVER & G. W. DRAKE.
DUPLEX FORMING MACHINE.

No. 553,802. Patented Jan. 28, 1896.

ATTEST.
T. B. Moser.
Allie Robinson.

INVENTORS.
George C. Bardons
John G. Oliver
George W. Drake
By H. S. Fisher ATTY

ANDREW B. GRAHAM, PHOTO-LITHO, WASHINGTON, D.C.

UNITED STATES PATENT OFFICE.

GEORGE C. BARDONS, JOHN G. OLIVER, AND GEORGE W. DRAKE, OF CLEVELAND, OHIO.

DUPLEX FORMING MACHINE.

SPECIFICATION forming part of Letters Patent No. 553,802, dated January 28, 1896.

Application filed July 20, 1895. Serial No. 556,610. (No model.)

*To all whom it may concern:*

Be it known that we, GEORGE C. BARDONS, JOHN G. OLIVER, and GEORGE W. DRAKE, citizens of the United States, residing in Cleveland, in the county of Cuyahoga and State of Ohio, have invented certain new and useful Improvements in Duplex Forming Machines; and we do hereby declare that the following is a full, clear, and exact description of the invention, which will enable others skilled in the art to which it appertains to make and use the same.

Our invention relates to duplex forming machines, and the special object of the invention in this instance is to provide a machine which is equipped and adapted to turn down and form bicycle-wheel hubs. However, it will be understood that the machine is not limited to this use and that it may be used to produce many other articles not enumerated herein, and with cutting-tools suited to each article.

The invention, therefore, consists in the construction, combination and arrangement of parts, substantially as shown and described, and particularly pointed out in the claims.

Figure 3:
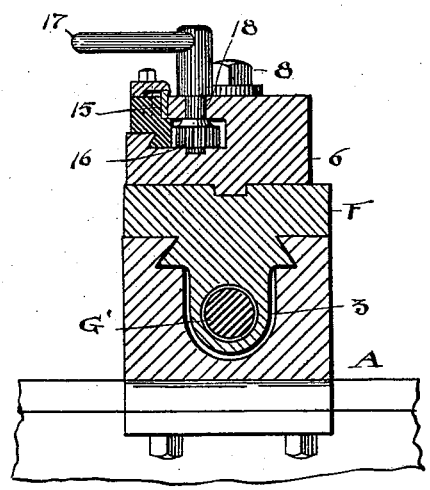
Figures 4, 5:
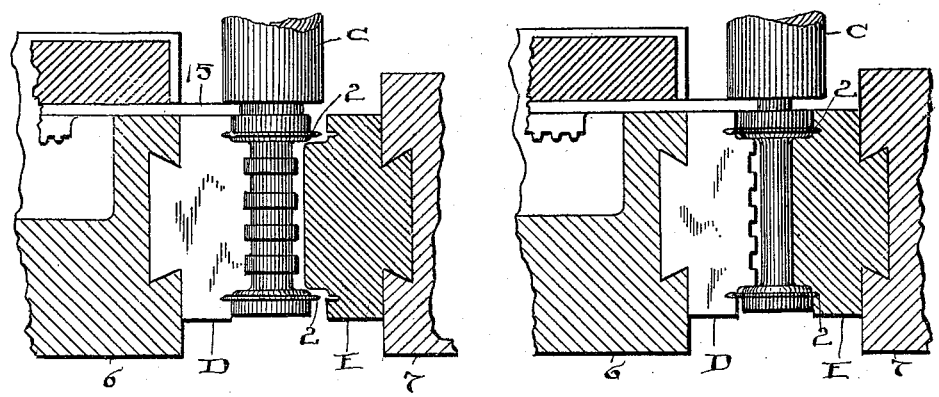

In the accompanying drawings, Figure 1 is a cross-section of the machine on the line of the feed-screw and at about the center of the cutters or tools and their immediate supports. Fig. 2 is a plan view of the portion of the machine shown in section in Fig. 1, and in the upper part of the figure discloses the chuck for holding and rotating the stock or material out of which the hub is formed. Fig. 3 is a cross-section of the machine on a line corresponding to 3 3, Fig. 2. Figs. 4 and 5 are part plan and part horizontal sections of the machine, showing different relations of the tools with the stock and the stock at the different stages of reduction.

A represents the bed and frame of the machine, which may be of any preferred style, and B the chuck by which the stock C is held and rotated. The stock C is always of such dimensions that when turned down into shape it will furnish the desired article complete in one piece, and in this instance produce a complete bicycle-wheel hub with the usual flanges 2 2 near its ends for attaching the radiating wires. Two different tools or cutters D and E are used for this purpose. The cutter D is what we term the "roughing-cutter" and the cutter E the "finishing-cutter." The cutter D works the stock in the rough down to substantially the form shown in Fig. 4, leaving a series of corrugations, and the finishing-cutter E comes into engaging or cutting position on these corrugations somewhere about a thirty-second of an inch behind cutter D. The depth of the cutting to be done and other conditions will determine somewhat the relation of the two tools to the work at the start; but when once in cutting engagement both tools work at the same time and together, until at the last as the roughing work is completed the quicker thread of the finishing-tool causes it to advance in the finishing work, thus practically taking the lead from the roughing-tool and completing its own work with the roughing-tool out of cutting position. It will be understood that the time employed in producing a hub is an important factor in its initial expense, and hence the importance of engaging both tools in the work as speedily as practicable and of keeping them so engaged as long as it can be done to advantage. How the movements of the cutters to do this work are effected will now be described. Thus, referring to Fig. 1, we see two sliding heads F and G having threaded extensions 3 and 4, respectively, on their bottom. A differential feed-screw G' traverses these extensions transversely of the machine and is controlled in this instance by hand-wheel 5, although an automatic feeding mechanism may be employed for this purpose.

Threads of different pitch and speed are employed for the two tools D and E, the tool D having the slower pitch and tool E the faster. This, of course, works both ways, so that a single rotation of the feed-screw or shaft G' will move both tools different distances, whether back or forth, according to the pitch of their threads. Hence the threads are so pitched, respectively, and the tools so set relatively to the work that the roughing-tool D will enter the work in advance of tool E, and the two tools will then operate as above described.

The cutters D and E are supported on and removably fixed to blocks or supports 6 and 7, which in turn are secured to heads F and G. These blocks are adjustable on the heads, the block 6 having vertical slots with adjusting-bolts 8 extending through into the head F and enabling the operator to set the cutter D at one place or another in respect to the stock, as desired. A set-screw 9 through part 10 on the head F helps to hold block 6 in adjusted position.

Immediately opposite block 6 is the block or standard 7, which carries cutter E. It will be noticed that the said cutters are arranged in different horizontal planes, the roughing-cutter being below the stock and the finishing-cutter above; but if preferred they might be reversed in position by also reversing the feed. The standard 7 has adjustment at right angles to block 6, as seen in Fig. 2, where bolts 11 and 12 pass through corresponding slots in the standard. Other adjustments for both part 6 and 7 may be provided for if required.

A severing-tool 15 for the hub is seen in the several figures. This tool, as shown here, is provided with a rack along its inner side, and a pinion 16, controlled by hand-lever 17, and the shaft 18 serves to operate the said tool independently of its support. This tool is supported on and fed in with tool D, and continues to work until the feed of tools D and E is stopped. Then the attendant operates the said cutter 15 alone and severs the finished hub. This is done by turning handle 17 and carrying the tool 15 forward the required distance. This completes the production of a single hub and removes it from the stock, and the parts are then all brought again to starting position, and the operation herein described is repeated. Obviously other means than those shown may be employed for actuating tool 15 without departing from the spirit of the invention.

What we claim is—

1. The machine-bed, the separate tool-carrying heads arranged to travel transversely of the machine, the feed-screw having differential threads reverse to each other to operate said heads, the cutter-tools, and the supports for said heads adjustably secured thereto, substantially as set forth.

2. In a machine as described, a roughing-tool and a finishing-tool having its lower edge substantially on a plane with the upper edge of the roughing-tool and in a different vertical plane, the blocks supporting said tools and the sliding heads F and G supporting said blocks, the head F supporting the roughing-tool having a threaded projection on its bottom and the head G having a projection 4 on its bottom with a coarser thread than projection 3 and of reverse pitch thereto, and a rod threaded and engaging through both said projections 4 and 5, whereby the roughing-tool is overtaken and passed by the finishing-tool, substantially as set forth.

Witness our hands to the foregoing specification this 6th day of July, 1895.

GEORGE C. BARDONS.
JOHN G. OLIVER.
GEORGE W. DRAKE.

Witnesses:
  H. T. FISHER,
  R. B. MOSER.